(12) United States Patent
Ackner et al.

(10) Patent No.: US 7,235,303 B2
(45) Date of Patent: *Jun. 26, 2007

(54) PHENOL-FREE DECORATIVE LAMINATES AND METHOD OF PRODUCING THE SAME

(75) Inventors: Fritz Ackner, Leipzig (DE); Pietro Cassaghi, D'Adda (IT); Gerhard Görmar, Leipzig (DE); Gerhard Kosche, Much (DE); Guiseppe Sorlo, Brunico (IT)

(73) Assignee: Dakor Melamin Impragnierungen GmbH, Heroldstaff (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/356,650

(22) Filed: Feb. 17, 2006

(65) Prior Publication Data

US 2006/0228572 A1 Oct. 12, 2006

Related U.S. Application Data

(63) Continuation-in-part of application No. 11/248,123, filed on Oct. 12, 2005.

(60) Provisional application No. 60/654,775, filed on Feb. 17, 2005.

(51) Int. Cl.
*B32B 27/00* (2006.01)

(52) U.S. Cl. ............. 428/423.1; 428/502; 428/505; 428/506; 528/230

(58) Field of Classification Search ............. 428/423.1, 428/502, 505, 506; 528/230
See application file for complete search history.

(56) References Cited

U.S. PATENT DOCUMENTS 4,997,905 A * 3/1991 Druet et al. ............. 528/230

FOREIGN PATENT DOCUMENTS

| DE | 2715020 C2 | 10/1978 |
| DE | 3208728 A1 | 9/1983 |
| DE | 3837965 A1 | 5/1990 |
| DE | 3876226 T2 | 1/1993 |
| DE | 69604044 T2 | 12/1999 |

* cited by examiner

*Primary Examiner*—Leszek Kiliman
(74) *Attorney, Agent, or Firm*—Brinks Hofer Gilson & Lione

(57) ABSTRACT

The invention relates to phenol-free decorative laminates, in the form of sheets, such as HPL, CPL and LPL, using multilayer carrier materials in which no phenol resins are used for impregnation and which are therefore toxicologically safe, have a neutral odor and are more economical in their production. The impregnating resin system used is a urea/melamine/formaldehyde resin which was processed exclusively in an aqueous reaction medium and to which a polymer dispersion was added, the impregnating resin having been prepared in a first stage in the pH range from 7.0 to 8.5 and in a second stage in the pH range from 4.0 to 6.0. Finally, this resin batch is neutralized, added to the carrier material and pressed with the latter.

8 Claims, No Drawings

PHENOL-FREE DECORATIVE LAMINATES AND METHOD OF PRODUCING THE SAME

CROSS-REFERENCE TO RELATED APPLICATIONS

The present application is a continuation-in-part of U.S. patent application Ser. No. 11/248,123 filed on Oct. 12, 2005 entitled "Phenol-Free Decoration Laminates and Method of Producing the Same." Furthermore, the present application claims priority to U.S. Provisional Ser. No. 60/654,775 filed Feb. 17, 2005 entitled "Phenol-Free Decoration Laminates and Method of Producing the Same."

FIELD OF THE INVENTION

The invention relates to phenol-free decorative laminates, i.e. decorative laminate sheets, such as HPL (high pressure laminate), CPL (continuous pressure laminate) and LPL (low pressure laminate), comprising multilayer carrier materials in which no phenol resins are used for impregnation and which are therefore toxicologically safe, have a neutral odor and are more economical in their production.

Decorative laminates, also referred to as decorative laminate sheets (HPL, CPL, LPL) according to DIN EN 438 Part 1, have a multilayer structure comprising layers of fiber webs (in particular paper), impregnated with curable resins. They are pressed at high temperature and under pressure.

BACKGROUND OF THE INVENTION

The decorative laminates known to date all consist of a surface layer impregnated with melamine resin and a plurality of lower layers impregnated with phenol resin, also referred to as core layers. So-called kraft paper is used for the lower layers. The surface is a special decorative paper which, by printing with special colors, represents the decorative surface.

These decorative laminates have the disadvantage that they have a strong intrinsic odor of phenol and even traces of unconverted phenol are still detectable in the laminate, depending on the production conditions. Phenol is toxicologically unsafe. Particularly in the recycling process and during incineration, even more toxic substances may form through thermal secondary reactions with other substances present, especially with halogen-containing organic compounds.

The phenol resin is produced exclusively in strongly basic reaction media with the use of alkali metal hydroxides. In order to ensure better reactivity of the resins during the impregnation process and especially during the curing process on pressing, it is necessary to adjust the pH of the kraft paper to about 8.5 to 9.0.

It is known that a reduction in the phenol content can be achieved by adding urea to the resin batch. However, a disadvantage thereby is that, with the use of urea contents above 10% by mass of urea in the solid resin, the good water resistance of the phenol resin decreases very greatly. The reason for this is that the urea does not react under the reaction conditions for phenol resins (pH>8) and readily leads to increased water absorption of the resin.

A further disadvantage of the production of decorative laminates from the combination of melamine resin-impregnated and phenol resin-impregnated papers consists in an incompatibility at the interfaces. This is due to the different catalysts which shift the pH of the impregnated papers into the acid or into the basic range. In the case of extreme differences, for example a pH of 9 in the case of the phenol resin-impregnated papers, delamination processes may readily occur at the interfaces.

SUMMARY OF THE INVENTION

The invention relates to phenol-free decorative laminates, in the form of sheets, such as HPL, CPL and LPL, using multilayer carrier materials in which no phenol resins are used for impregnation and which are therefore toxicologically safe, have a neutral odor and are more economical in their production. The impregnating resin system used is a urea/melamine/formaldehyde resin which was processed exclusively in an aqueous reaction medium and to which a polymer dispersion was added, the impregnating resin having been prepared in a first stage in the pH range from 7.0 to 8.5 and in a second stage in the pH range from 4.0 to 6.0. Finally, this resin batch is neutralized, added to the carrier material and pressed with the latter.

It is an object of the invention to provide phenol-free decorative laminates (decorative laminate sheets—HPL, CPL and LPL) comprising multilayer carrier materials which are impregnated with binders (impregnating resins), bonded and cured, in which laminates no phenol resins are used. They should therefore be particularly suitable for the interior sector, should have a neutral odor and should be toxicologically safe and more economical. Owing to the absence of the phenol resins, they do not pollute the room atmosphere by expelled phenol. The requirements which the laminate has to meet furthermore consist in the fact that it should be suitable for postforming and it can be produced and processed on all known production lines for laminates, e.g. short-cycle presses.

The object is achieved by impregnated kraft papers for the core layers of the decorative laminate (decorative laminate sheets—HPL, CPL, LPL) based on impregnating resin systems in which the impregnating resin system used is a urea/melamine/formaldehyde resin which was processed exclusively in an aqueous reaction medium and to which a polymer dispersion was added, a precondensate of urea, melamine and formaldehyde having been prepared for the impregnating resin in a first stage in the presence of a not very reactive catalyst in the pH range from 7.0 to 8.5 and in a temperature range from 75° C. to 95° C. and, in a second stage, a relatively stronger acidic catalyst, together with urea, melamine and an aqueous polymer dispersion, having been added to the precondensate in the pH range from 4.0 to 6.0 and at a temperature of from 75° C. to 95° C. and, after the end of the reaction time, the prepared impregnating resin having been adjusted to a pH of from 8.0 to 8.5 by adding alkali.

Suitable carrier materials are those which are known per se for the production of laminates. Preferably used carrier materials are kraft paper and/or other absorptive papers.

In order to make the impregnating resin flexible, particularly suitable aqueous polymer dispersions are those of acrylate or methacrylate or vinyl acetate homopolymers or styrene/acrylate, styrene/methacrylate or polybutadiene/styrene copolymers in amounts of from 0.5% by mass to 10% by mass.

The impregnating resin is prepared by a special two-stage process.

In the first stage of the process, urea and melamine are reacted with formaldehyde in the presence of a not very reactive catalyst in the pH range from 7.0 to 8.0 at a temperature of from 75° C. to 95° C.

In this first stage, ammonium salts or alkylammonium salts and salts of amino alcohols with strong inorganic and organic acids are preferably added to the batch as not very reactive catalysts in amounts of from 0.05 to 1% by mass (based on total amount of batch).

In a second stage, urea, melamine and a strong acidic catalyst in the pH range from 4.0 to 6.0 and, if required, a polymer dispersion are added to the batch at from 75° C. to 95° C.

The catalyst in the second stage is preferably a mineral acid or an ammonium salt of a mineral acid or of a very strong organic acid in amounts of from 1% by mass to 15% by mass, based on the total batch. After the end of the reaction, the resin batch is neutralized.

The production of phenol-free laminate sheets (HPL, CPL and LPL) is then effected by impregnating the core layers of the laminate by impregnation of the carrier material, in particular of kraft papers, with the resin system thus prepared and pressing said layers,

- an acidic catalyst having retarded reactivity being added to the impregnating resin before the process for the impregnation of the core papers,
- the surface pH of the kraft paper used being from 7.0 to 7.5 and
- the proportion of resin after drying being from 30% by mass to 50% by mass, based on the total mass of the impregnated paper web.

Preferably used catalysts are ammonium salts or alkylammonium salts and salts of amino alcohols of strong inorganic and organic acids (e.g. benzyldimethylammonium tosylate) in amounts of from 1% by mass to 15% by mass, the pH of the impregnating resin being adjusted to 6.5 to 7.5.

The impregnation of the paper webs can be carried out using all customary machine systems for application of impregnating resins.

The further processing of the paper webs impregnated with the impregnating resin described according to the invention is effected according to the customary and known technologies, for example in short-cycle presses.

It is advantageous if the cycle times of the presses are substantially shortened. During pressing to obtain the high pressure laminate, the processing is easier because the novel amino impregnating resin has better flow properties than phenol resins for core layers. In contrast to the base-catalyzed phenol resins, the impregnating resin described according to the invention cures substantially more rapidly.

The laminates produced are more homogeneous in structure because the decorative surface layer and the supporting core layers were produced using impregnating resin systems of related types. Moreover, no pH differences are possible at the interfaces, and the danger of delamination is therefore completely excluded.

The laminate produced according to the invention has no intrinsic odor at all and is completely free of the toxic phenol. The product has better properties in waste recycling. In the case of thermal recycling, toxic reaction products such as those with the use of phenol resins cannot form, owing to the constitution.

The invention is explained in the following embodiment, without being restricted thereto.

EXAMPLE

Resin Preparation

At the beginning of the reaction, 750 kg of formaldehyde solution (36% strength aqueous), 290 kg of urea and 1.6 kg of melamine are combined with stirring in a stirred reactor equipped with a reflux condenser. A quaternary ammonium salt of p-toluene sulfonic acid in an amount of 0.05% mass (related to total amount of batch) as well as formic acid (75% strength aqueous) in an amount of 0.05% mass (related to total amount of batch) are added. The pH is adjusted to between 7.5 and 8.0. If the pH is too low, it is adjusted by adding sodium hydroxide solution. The reaction temperature is increased to 95° C. It should be noted that the reaction is slightly exothermic. The reaction time is about 45 min.

A 20% strength ammonium sulfate solution is then added until the pH is from 4.0 to 4.2. The reaction is continued for 90 min at a temperature of 95° C. Cooling to 80° C. is then effected. A further 230 kg of urea, 150 kg of melamine and optionally, 100 kg of a styrene/butylacrylate polymer dispersion with a solids content of 50% and about 500 kg of water are added to the reaction batch. After the end of the reaction, the resin batch is adjusted to a pH of from 8.5 to 9.0 with 10% strength sodium hydroxide solution. The batch is heated to 80° C. for a further 30 min and then cooled to room temperature. The pH is about 8.0. This resin solution has a shelf life of several days.

Resin Application

A kraft paper is impregnated in a known manner in an impregnating resin unit of the type VITS. Before application of the resin, the impregnating resin is adjusted with a catalyst (ammonium tosylate) so that a gel is obtained in the so-called boiling test of the resin solution.

Impregnation is effected with this resin solution in a known manner so that, after drying, the kraft paper web has a resin content of about 30% to 60%.

Laminate Production

The impregnated paper (impregnated as described) is pressed in a plurality of layers together with the melamine resin-impregnated decorative surface layer in a short-cycle press to give a laminate. The pressure for pressing is from 20 bar to 100 bar, the temperature during pressing is from 120° C. to 170° C. and the pressing time is from 30 to 3600 sec. The phenol-free laminate obtained is further processed in the known manner.

While the above description constitutes the preferred embodiment of the present invention, it will be appreciated that the invention is susceptible to modification, variation and change without departing from the proper scope and fair meaning of the accompanying claims.

The invention claimed is:

1. A phenol-free decorative laminate sheet comprising multilayer carrier materials which are impregnated with binders, bonded and cured, wherein the impregnating resin used is a urea/melamine/formaldehyde resin which was processed exclusively in an aqueous reaction medium and to which a polymer dispersion was added,

- a precondensate of urea, melamine and formaldehyde having been prepared for the impregnating resin in a first stage in the presence of a first reactive catalyst in the pH range from 7.0 to 8.5 in a temperature range from 75° C. to 95° C. and, in a second stage, an acidic second catalyst, together with urea, melamine and an aqueous polymer dispersion, having been added to the precondensate in the pH range from 4.0 to 6.0 and at a temperature of from 75° C. to 95° C. and, after the end of the reaction time, the prepared impregnating resin having been adjusted to a pH of from 8.0 to 8.5 by adding alkali; and
- the polymer dispersion used is one or more of acrylate, methacrylate, vinyl acetate homopolymers. styrene/ acrylate, styrene/methacrylate, or polybutadiene/styrene copolymers in amounts of from 0.5% mass to 10% mass.

2. The phenol-free decorative laminate as claimed in claim 1, wherein kraft paper and/or other absorptive papers are used as the carrier materials.

3. The phenol-free decorative laminate as claimed in claim 1, wherein the urea/melamine/formaldehyde resins having a composition of from 20% mass to 45% mass of formaldehyde, from 35% mass to 60% mass of urea and from 2 to 20% by mass of melamine are used for the impregnation.

4. A process for the production of phenol-free decorative laminates comprising multilayer carrier materials which are impregnated with impregnation resin, wherein the impregnating resin is formed by
   recurring urea, melamine and formaldehyde in the presence of a first reactive catalyst in the pH range from 7.0 to 8.0 at a temperature of from 75° C. to 95° C.
   in a second stage, urea, melamine and an acidic second catalyst in the pH range from 4.0 to 6.0 are added at from 75° C. to 95° C.,
   after the end of the reaction, the resin batch is adjusted to a pH of from about 8.0 to 8.5 and
   the carrier material is impregnated with the resin system thus obtained and is pressed.

5. The process for the production of phenol-free decorative laminates as claimed in claim 4, wherein the first catalyst used in the first stage of the resin preparation is an alkylammonium salt and salts of amino alcohols with strong organic or inorganic acids in an amount of from 0.05% mass to 1.0% mass, based on the resin batch.

6. The process for the production of phenol-free decorative laminates as claimed in claim 4, wherein the second catalyst used in the second stage of the resin preparation is a mineral acid or strong organic acid or ammonium salts thereof in amounts of from 1% by mass to 15% by mass, based on the proportion of resin.

7. The process for the production of phenol-free decorative laminates as claimed in one or more of claims 4, wherein a slightly acidic, not very reactive third catalyst is added again to the resin system, before the carrier materials, in particular kraft papers having a surface pH of from 7.0 to 7.5, are subsequently impregnated with the resin thus obtained and are pressed with one another, the proportion of resin after drying being from 30% mass to 60% mass, based on the basic mass of the impregnated material.

8. The process for the production of phenol-free decorative laminates as claimed in claim 7, wherein an alkylammonium salt or a salt of amino alcohols with a strong organic or inorganic acid is added as the third catalyst in an amount of from 1% by mass to 15% by mass to the resin system before the impregnation of the kraft paper, and the pH of the resin system is adjusted to 6.5 to 7.5.

* * * * *